US012085944B2

(12) United States Patent
Park et al.

(10) Patent No.: US 12,085,944 B2
(45) Date of Patent: Sep. 10, 2024

(54) MOVING PATH PLANNING APPARATUS AND METHOD FOR ROBOT

(71) Applicants: YUJIN ROBOT CO., LTD., Incheon (KR); Miele & Cie. KG, Gütersloh (DE)

(72) Inventors: Seong Ju Park, Incheon (KR); Chang Soo Kim, Incheon (KR); In Hwan Kwon, Incheon (KR); Jee Seon Kim, Incheon (KR)

(73) Assignees: YUJIN ROBOT CO., LTD., Incheon (KR); Miele & Cie. KG, Gütersloh (DE)

( * ) Notice: Subject to any disclaimer, the term of this patent is extended or adjusted under 35 U.S.C. 154(b) by 271 days.

(21) Appl. No.: 17/682,396

(22) Filed: Feb. 28, 2022

(65) Prior Publication Data

US 2022/0280010 A1    Sep. 8, 2022

(30) Foreign Application Priority Data

Mar. 2, 2021 (KR) .......... 10-2021-0027648
Jun. 7, 2021 (KR) .......... 10-2021-0073685

(51) Int. Cl.
*G05D 1/00* (2024.01)
*A47L 11/40* (2006.01)

(52) U.S. Cl.
CPC ......... *G05D 1/0219* (2013.01); *G05D 1/0217* (2013.01); *G05D 1/0238* (2013.01); *G05D 1/0274* (2013.01); *A47L 11/4011* (2013.01); *A47L 2201/04* (2013.01)

(58) Field of Classification Search
CPC .. G01C 21/3407; A47L 11/4088; A47L 11/24; G05D 1/0297; G05D 1/0214; G06V 20/10; G07C 5/085; B60W 30/162; B60W 40/072; B60W 30/18; B60W 30/12; B60W 30/0956; G06F 7/76; E04D 13/006; B25J 5/007; G08G 5/0021
See application file for complete search history.

(56) References Cited

U.S. PATENT DOCUMENTS

| | | | |
|---|---|---|---|
| 6,393,362 B1* | 5/2002 | Burns | G05D 1/0297 701/119 |
| 11,530,921 B2* | 12/2022 | Nimmagadda | G08G 5/0021 |
| 11,537,130 B2* | 12/2022 | Gaschler | B25J 5/007 |
| 2010/0225341 A1* | 9/2010 | Burrows | E04D 13/006 324/718 |
| 2012/0046802 A1* | 2/2012 | Inou | B60W 30/0956 701/1 |

(Continued)

FOREIGN PATENT DOCUMENTS

| | | |
|---|---|---|
| JP | 2019-21199 A | 2/2019 |
| KR | 10-2017-0061972 A | 6/2017 |
| KR | 10-2019-0117421 A | 10/2019 |

*Primary Examiner* — Yuri Kan
(74) *Attorney, Agent, or Firm* — BROADVIEW IP LAW, PC

(57) ABSTRACT

A moving path planning apparatus and method for a robot according to the exemplary embodiment of the present disclosure determine an actual moving path using a robot parameter set in advance on the basis of a moving path pattern acquired for every sub region of the map to determine an actual moving path of the robot in consideration of the turning radius of the robot.

13 Claims, 9 Drawing Sheets

(56) References Cited

U.S. PATENT DOCUMENTS

| | | | |
|---|---|---|---|
| 2015/0329108 A1* | 11/2015 | Kodaira | B60W 30/12 |
| | | | 701/41 |
| 2017/0010618 A1* | 1/2017 | Shashua | B60W 30/18 |
| 2018/0373248 A1* | 12/2018 | Chornenky | G06F 7/76 |
| 2019/0187717 A1* | 6/2019 | He | A47L 11/24 |
| 2020/0000302 A1* | 1/2020 | Morin | A47L 11/4088 |
| 2020/0094839 A1* | 3/2020 | Clarke | B60W 40/072 |
| 2020/0310452 A1* | 10/2020 | Oyama | B60W 30/162 |
| 2020/0312052 A1* | 10/2020 | Bonnevay | G07C 5/085 |
| 2020/0379468 A1* | 12/2020 | Sakhdari | G05D 1/0214 |
| 2023/0305573 A1* | 9/2023 | Xie | G06V 20/10 |

* cited by examiner (a)

(b)

(a)            (b)

MOVING PATH PLANNING APPARATUS AND METHOD FOR ROBOT

CROSS-REFERENCE TO RELATED APPLICATIONS

This application is based on and claims priority under 35 U.S.C. 119 to Korean Patent Application No. 10-2021-0027648 filed in the Korean Intellectual Property Office on Mar. 2, 2021, and Korean Patent Application No. 10-2021-0073685 filed in the Korean Intellectual Property Office on Jun. 7, 2021, the entire contents of which are herein incorporated by reference in its entirety.

BACKGROUND

Field

The present disclosure relates to a moving path planning apparatus and method for a robot, and more particularly, to an apparatus and a method for planning a moving path of a robot.

Description of the Related Art

The most important issue of a mopping cleaning robot is to clean with a brush while spraying water and suck up all the water sprayed on the floor through a water intake at the rear. The mopping cleaning robot of the related art changes the position to a next cleaning line by rotating in place. Therefore, when the cleaning line of the mopping cleaning robot is changed, the mopping cleaning robot cannot suck up all the water sprayed on the floor.

SUMMARY

An object to be achieved by the present disclosure is to provide a moving path planning apparatus and method for a robot which determine an actual moving path using a predetermined robot parameter on the basis of a moving path pattern acquired for every sub region of a map.

Other and further objects of the present invention which are not specifically described can be further considered within the scope easily deduced from the following detailed description and the effect.

In order to achieve the above-described objects, according to an aspect of the present disclosure, a moving path planning apparatus for a robot includes: a moving path pattern acquiring unit which acquires one or more sub regions from a map and acquires a robot moving path pattern for each of one or more sub regions; and a moving path determining unit which plans an actual moving path of the robot for each of one or more sub regions on the basis of a predetermined robot parameter and the moving path pattern for the sub region.

Here, the moving path determining unit acquires a plurality of preliminary paths using a forward gaze distance and a minimum turning radius according to the predetermined robot parameter, on the basis of a current position of the robot and determines one preliminary path among the plurality of preliminary paths as the actual moving path of the robot on the basis of a distance from the moving path pattern and a distance from an obstacle.

Here, the moving path determining unit acquires a plurality of front points which is separated from a center point of the robot by the forward gaze distance at a predetermined angle unit, acquires a preliminary path candidate group by generating an arc connecting the robot and each of the plurality of front points, and acquires preliminary paths having a turning radius which is larger than the minimum turning radium, among the preliminary path candidate group, as the plurality of preliminary paths.

Here, the moving path determining unit acquires the plurality of front points with respect to a centroid of two steering wheels of the robot and acquires the preliminary path candidate group by generating an arc for each of the plurality of front points using a geometric path tracking method (pure pursuit algorithm).

Here, the moving path determining unit acquires an evaluation score for each of the plurality of preliminary paths on the basis of the distance from the moving path pattern and the distance from the obstacle and determines a preliminary path having the highest evaluation score, among the plurality of preliminary path, as the actual moving path of the robot.

Here, the moving path determining unit acquires the evaluation score on the basis of a first distance score acquired on the basis of a distance between the preliminary path and the moving path pattern, a predetermined first weight for the first distance score, a second distance score acquired on the basis of the distance between the preliminary path and the obstacle, and a predetermined second weight for the second distance score, as the distance between the preliminary path and the moving path pattern becomes shorter, a higher score is assigned as the first distance score, and as the distance between the preliminary path and the obstacle becomes longer, a higher score is assigned as the second distance score.

Here, the moving path pattern acquiring unit acquires a centroid for a target region of the map, acquires a polygon having the maximum size corresponding to the target region while increasing a size of the polygon to a predetermined unit size with reference to the centroid for the target region, acquires the acquired polygon having the maximum size as the sub region, and acquires one or more sub regions from the map by repeatedly performing a process of excluding the polygon having the maximum size acquired as the sub region from the target region, on the target region, until the size of the target region becomes smaller than a robot size according to the predetermined robot parameter.

Here, the moving path pattern acquiring unit determines a type of the polygon on the basis of a shape of the target region.

Here, the moving path pattern acquiring unit acquires a centroid for each of one or more sub regions, acquires a plurality of path patterns which is formed of points having the same distance value with respect to the centroid for the sub region in the unit of the predetermined distance interval, and acquires the plurality of acquired path patterns as the moving path pattern for the sub region.

In order to achieve the above-described objects, according to an aspect of the present disclosure, a moving path planning method for a robot includes: acquiring one or more sub regions from a map and acquiring a robot moving path pattern for each of one or more sub regions; and determining an actual moving path of the robot for each of one or more sub regions on the basis of a predetermined robot parameter and the moving path pattern for the sub region.

Here, the planning of an actual moving path includes: a first step of acquiring a plurality of preliminary paths using a forward gaze distance and a minimum turning radius according to the predetermined robot parameter, on the basis of a current position of the robot; and a second step of determining one preliminary path among the plurality of preliminary paths as the actual moving path on the basis of a distance from the moving path pattern and a distance from an obstacle.

Here, in the first step, a plurality of front points which is separated from a centroid of the robot by the forward gaze distance is acquired in the unit of a predetermined angle, a preliminary path candidate group is generated by generating an arc connecting the robot and each of the plurality of front points, and preliminary paths having a turning radius which is larger than the minimum turning radius, among the preliminary path candidate group, are acquired as the plurality of preliminary paths.

Here, in the second step, an evaluation score for each of the plurality of preliminary paths is acquired on the basis of the distance from the moving path pattern and the distance from the obstacle and a preliminary path having the highest evaluation score, among the plurality of preliminary path, is determined as the actual moving path of the robot.

Here, in the second step, the evaluation score is acquired on the basis of a first distance score acquired on the basis of a distance between the preliminary path and the moving path pattern, a predetermined first weight for the first distance score, a second distance score acquired on the basis of the distance between a preliminary path and the obstacle, and a predetermined second weight for the second distance score, as the distance between the preliminary path and the moving path pattern becomes shorter, a higher score is assigned as the first distance score, and as the distance between the preliminary path and the obstacle becomes longer, a higher score is assigned as the second distance score.

In order to achieve the aforementioned technical object, a computer program according to the exemplary embodiment of the present disclosure is stored in a computer-readable recording medium to execute any one of the aforementioned moving path planning methods for a robot on a computer.

According to the moving path planning apparatus and method for a robot according to the exemplary embodiment of the present disclosure, an actual moving path is determined using a predetermined robot parameter on the basis of a moving path pattern acquired for every sub region of the map to determine an actual moving path of the robot in consideration of the turning radius of the robot.

The effects of the present invention are not limited to the technical effects mentioned above, and other effects which are not mentioned can be clearly understood by those skilled in the art from the following description

DETAILED DESCRIPTION OF THE EMBODIMENT

Figure 1:
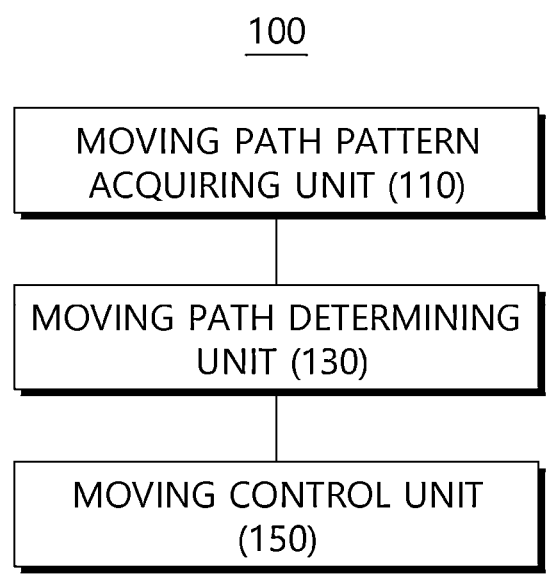
FIG. 1 is a block diagram illustrating a moving path planning apparatus for a robot according to an exemplary embodiment of the present disclosure.

Hereinafter, embodiments of the present disclosure will be described in detail with reference to the accompanying drawings. Advantages and characteristics of the present invention and a method of achieving the advantages and characteristics will be clear by referring to exemplary embodiments described below in detail together with the accompanying drawings. However, the present invention is not limited to exemplary embodiments disclosed herein but will be implemented in various different forms. The exemplary embodiments are provided by way of example only so that a person of ordinary skilled in the art can fully understand the disclosures of the present invention and the scope of the present invention. Therefore, the present invention will be defined only by the scope of the appended claims. Like reference numerals indicate like elements throughout the specification.

Unless otherwise defined, all terms (including technical and scientific terms) used in the present specification may be used as the meaning which may be commonly understood by the person with ordinary skill in the art, to which the present invention belongs. It will be further understood that terms defined in commonly used dictionaries should not be interpreted in an idealized or excessive sense unless expressly and specifically defined.

In the specification, the terms "first" or "second" are used to distinguish one component from the other component so that the scope should not be limited by these terms. For example, a first component may be referred to as a second component, and similarly, a second component may be referred to as a first component.

In the present specification, in each step, numerical symbols (for example, a, b, and c) are used for the convenience of description, but do not explain the order of the steps so that unless the context apparently indicates a specific order, the order may be different from the order described in the specification. That is, the steps may be performed in the order as described or simultaneously, or an opposite order.

In this specification, the terms "have", "may have", "include", or "may include" represent the presence of the characteristic (for example, a numerical value, a function, an operation, or a component such as a part"), but do not exclude the presence of additional characteristic.

The term "~unit" used in the specification refers to a software or hardware component such as a field programmable gate array (FPGA) or an ASIC and "~unit" performs some functions. However, "~unit" is not limited to the software or the hardware. "~unit" may be configured to be in an addressable storage medium or may be configured to reproduce one or more processors. Accordingly, as an example, "~unit" includes components such as software components, object oriented software components, class components, and task components, processes, functions, attributes, procedures, subroutines, segments of a program code, drivers, a firmware, a microcode, a circuit, data structures, and variables. A function which is provided in the components and "~units" may be combined with a smaller number of components and "~units" or further divided into additional components and "~units".

Hereinafter, an exemplary embodiment of a moving path planning apparatus and method for a robot according to the present disclosure will be described in detail with reference to the accompanying drawings.

First, a moving path planning apparatus for a robot according to an exemplary embodiment of the present disclosure will be described with reference to FIGS. 1 to 7.

Figure 2:
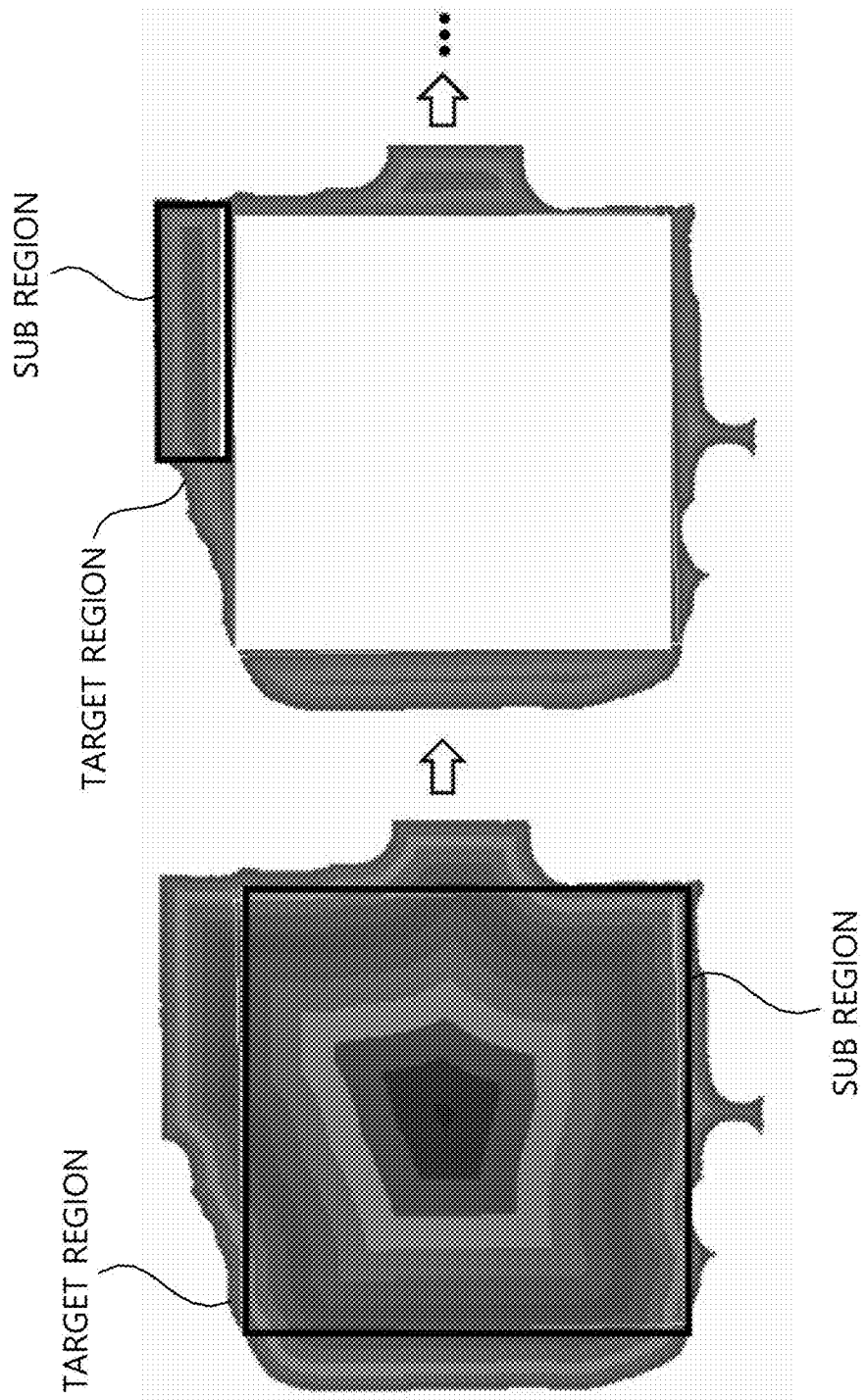
FIG. 2 is a view for explaining a sub region acquiring process according to an exemplary embodiment of the present disclosure.
Figure 3:
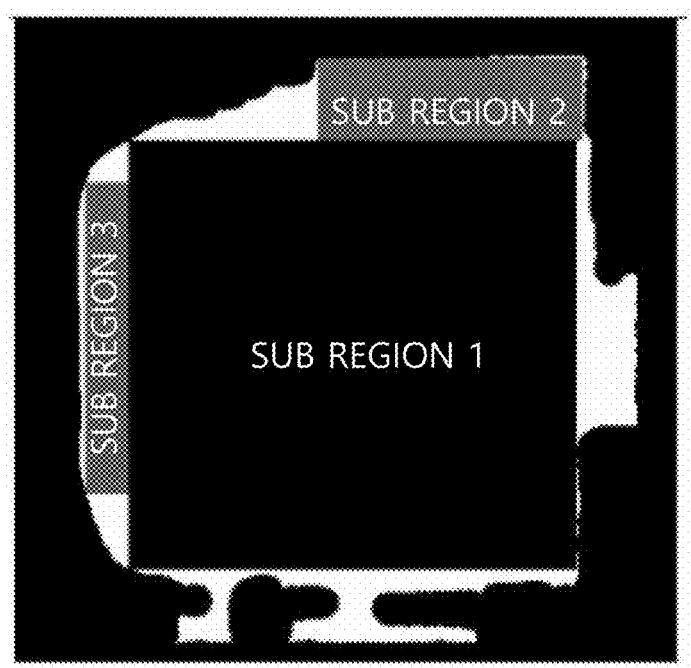
FIG. 3 is a view for explaining a moving path pattern acquiring process according to an exemplary embodiment of the present disclosure in which (a) of FIG. 3 illustrates an example of a sub region corresponding to a map and (b) of FIG. 3 illustrates an example of a moving path pattern for every sub region illustrated in (a) of FIG. 3.
Figure 3:
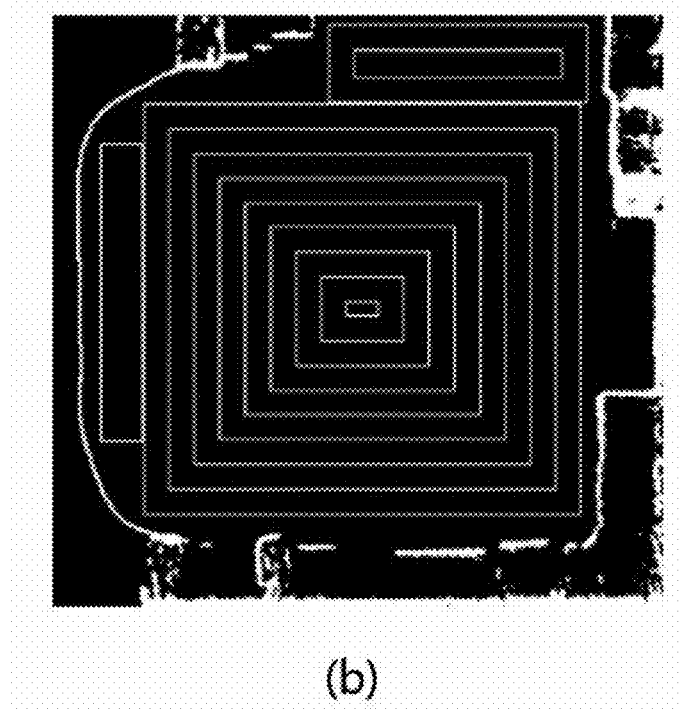
Figure 4:
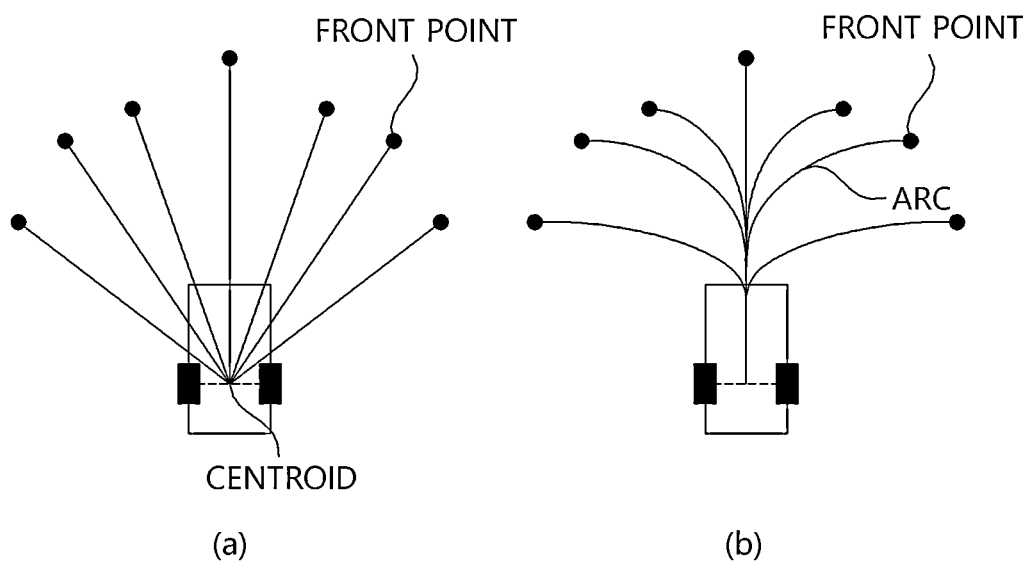
FIG. 4 is a view for explaining a preliminary path acquiring process according to an exemplary embodiment of the present disclosure in which (a) of FIG. 4 illustrates an example of a front point and (b) of FIG. 4 illustrates an example of an arc corresponding to the front point illustrated in (a) of FIG. 4.
Figure 5:
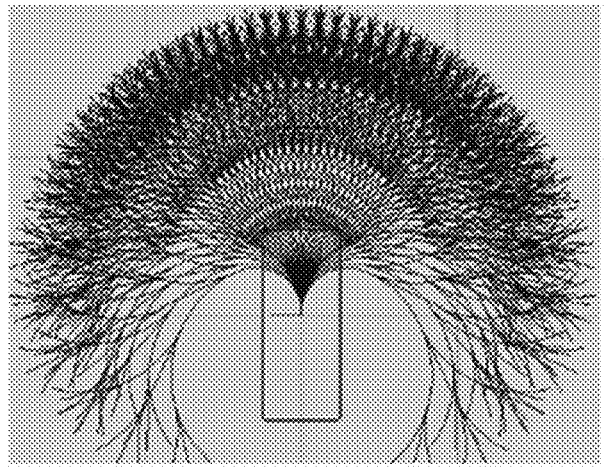
FIG. 5 is a view for explaining a change of a length of an arc according to a forward gaze distance according to an exemplary embodiment of the present disclosure.
Figure 5:
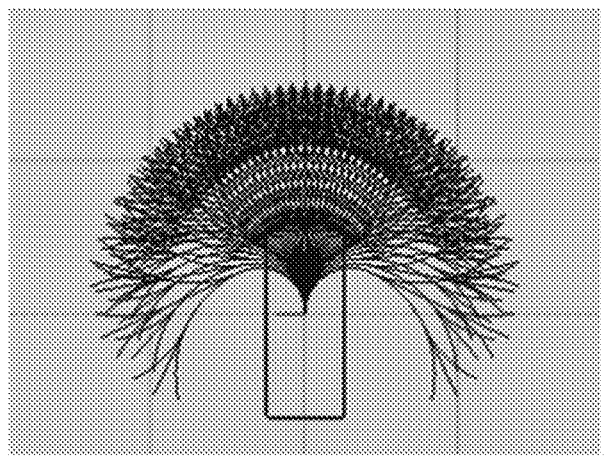
Figure 5:
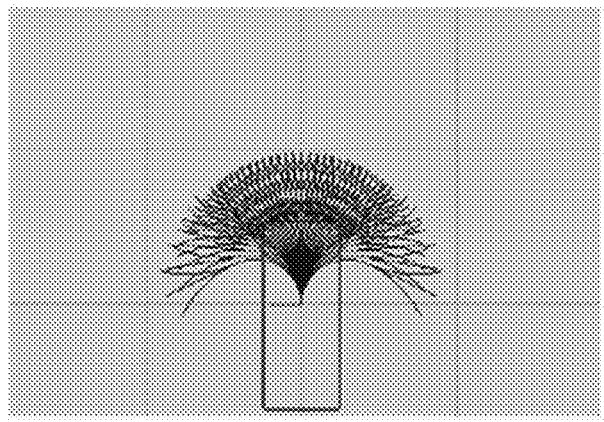
Figure 6:
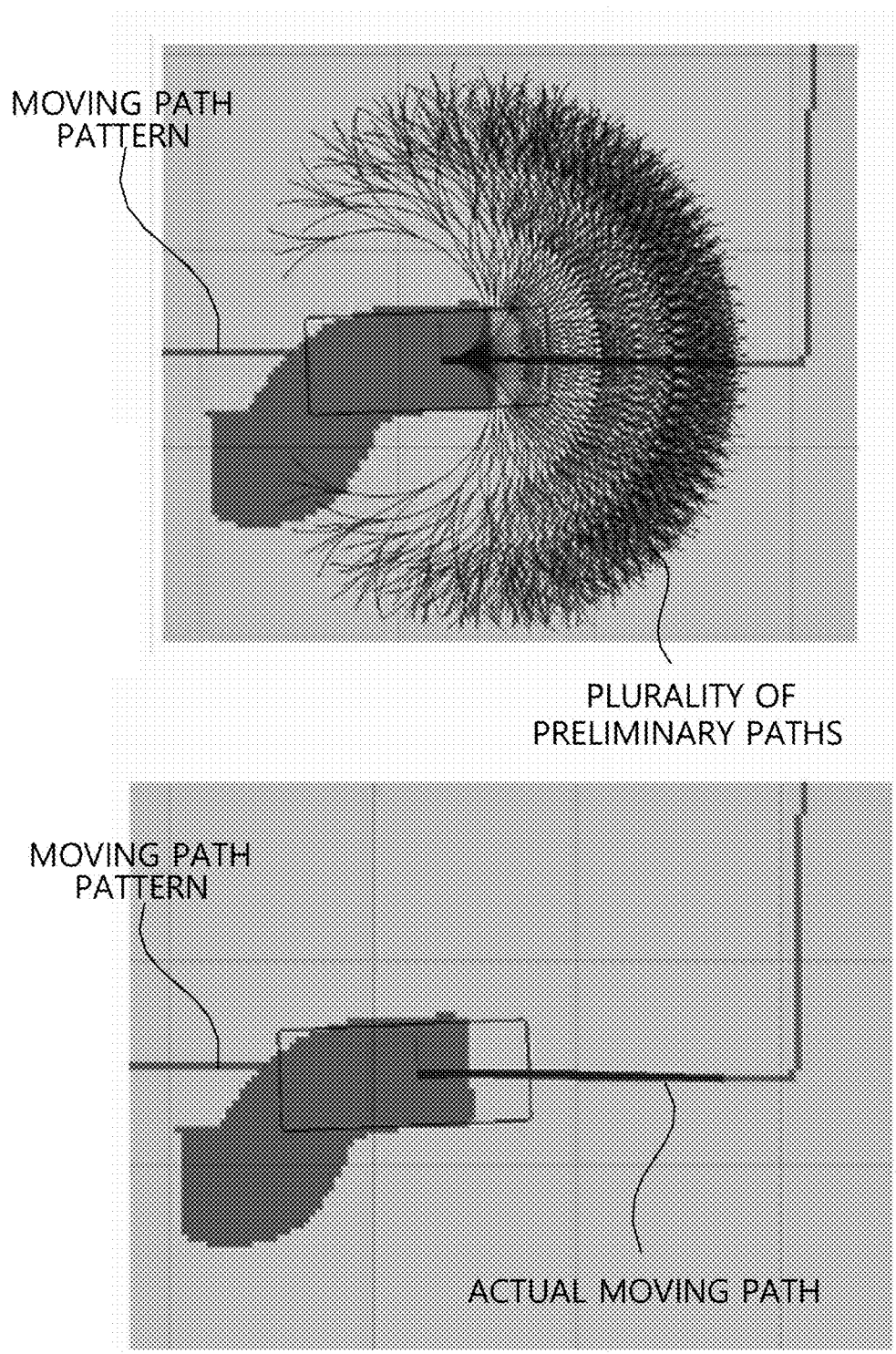
FIG. 6 is a view illustrating an actual moving path determining process according to an exemplary embodiment of the present disclosure.
Figure 7:
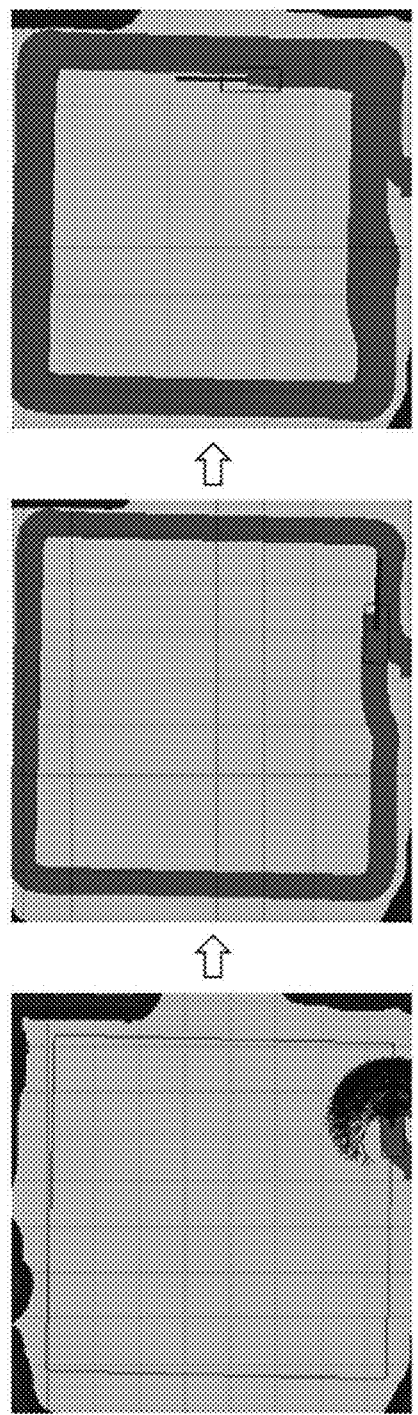
FIG. 7 is a view illustrating an example that a robot moves along an actual moving path according to an exemplary embodiment of the present disclosure.

FIG. 1 is a block diagram illustrating a moving path planning apparatus for a robot according to an exemplary embodiment of the present disclosure; FIG. 2 is a view for explaining a sub region acquiring process according to an exemplary embodiment of the present disclosure; FIG. 3 is a view for explaining a moving path pattern acquiring process according to an exemplary embodiment of the present disclosure in which (a) of FIG. 3 illustrates an example of a sub region corresponding to a map and (b) of FIG. 3 illustrates an example of a moving path pattern for every sub region illustrated in (a) of FIG. 3; FIG. 4 is a view for explaining a preliminary path acquiring process according to an exemplary embodiment of the present disclosure in which (a) of FIG. 4 illustrates an example of a front point and (b) of FIG. 4 illustrates an example of an arc corresponding to the front point illustrated in (a) of FIG. 4; FIG. 5 is a view for explaining a change of a length of an arc according to a forward gaze distance according to an exemplary embodiment of the present disclosure; FIG. 6 is a view illustrating an actual moving path determining process according to an exemplary embodiment of the present disclosure; and FIG. 7 is a view illustrating an example that a robot moves along an actual moving path according to an exemplary embodiment of the present disclosure.

Referring to FIG. 1, a moving path planning apparatus 100 for a robot (hereinafter, referred to as a moving path planning apparatus) according to an exemplary embodiment of the present disclosure determines an actual moving path using a predetermined robot parameter on the basis of a moving path pattern acquired for every sub region of a map.

Here, the predetermined robot parameter may include a robot size, a robot shape (a rectangle or a circle), a forward gaze distance, a minimum turning radius, or speed information (maximum speed or acceleration).

In the meantime, the moving path planning apparatus 100 according to the present disclosure is implemented as hardware or software to be loaded in a robot (not illustrated) such as a cleaning robot or a mobile robot. In this case, the moving path planning apparatus 100 loaded in the robot may acquire a moving path pattern for every sub region of a grid map built while the robot moves and determine an actual moving path using the moving path pattern acquired for every sub region and the predetermined robot parameter. By doing this, the robot may move along the actual moving path.

In other words, the moving path planning apparatus 100 determines an actual moving path of a robot using a predetermined robot parameter to allow a robot to move along a moving path pattern corresponding to a sub region and change the moving pattern to another moving pattern while moving along an oval path, rather than rotating in place. For example, the most important issue of the mopping cleaning robot is to clean with a brush while spraying water and suck up all the water sprayed on the floor through a water intake at the rear. When the mopping cleaning robot changes the position to the next cleaning line by rotation in place, the mopping cleaning robot cannot suck up all the water sprayed on the floor. In contrast, according to the present disclosure, when the position is changed to the next moving path pattern while moving through an oval path such as a bulb shape, the robot may change the position to the next moving path pattern while sucking up all the water sprayed on the floor. That is, the moving path planning apparatus 100 according to the present disclosure may determine an actual moving path of a robot in consideration of a turning radius of a robot.

To this end, the moving path planning apparatus 100 includes a moving path pattern acquiring unit 110, a moving path determining unit 130, and a moving control unit 150.

The moving path pattern acquiring unit 110 acquires one or more sub regions in a map.

To be more specific, the moving path pattern acquiring unit 110 may acquire a centroid for a target region of the map.

The moving path pattern acquiring unit 110 may acquire a polygon having the maximum size corresponding to the target region while increasing a size of the polygon by a predetermined unit size with reference to the centroid for the target region.

At this time, the moving path pattern acquiring unit 110 may determine the type of the polygon on the basis of a shape of the target region. For example, the moving path pattern acquiring unit 110 evaluates a similarity between a shape of the target region and polygonal shapes (a triangle, a rectangle, and a pentagon) and determines a polygonal shape having the highest similarity as a shape of the polygon corresponding to the target region.

The moving path pattern acquiring unit 110 acquires a polygon having the maximum size as a sub region.

The moving path pattern acquiring unit 110 excludes the polygon having the maximum size which has been acquired as a sub region from the target region.

The moving path pattern acquiring unit 110 repeats "the process of acquiring a centroid of the target region"→"the process of acquiring a polygon having the maximum size corresponding to the target region"→"the process of acquiring the polygon having the maximum size as a sub region"→"the process of excluding the polygon having the maximum size from the target region" on the target region until the size of the target region becomes smaller than a robot size according to the predetermined robot parameter to acquire one or more sub regions from the map.

For example, as illustrated in FIG. 2, a centroid for an initial target region (that is, the entire region of the map) of the map may be acquired. When the map is a grid map, a distance value to an obstacle (a black region) such as a wall in the grid map may be acquired in the unit of pixels of the grid map. By doing this, as illustrated in the left of FIG. 2, a center region becomes a centroid of the given grid map. A polygon (that is, a sub region) having the maximum size corresponding to the target region may be acquired while increasing the size of the rectangle with respect to the centroid for the target region. Next, "the process of acquiring a centroid of the target region"→"the process of acquiring the polygon having the maximum size corresponding to the target region"→"the process of acquiring the polygon having the maximum size as a sub region"→"the process of excluding the polygon having the maximum size from the target region" are repeated on the remaining target regions excluding the polygon (that is, the sub region) having the maximum size from the initial target region of the map until the size of the remaining target region becomes smaller than the robot size to acquire one or more sub regions corresponding to the map.

Further, the moving path pattern acquiring unit 110 may acquire a moving path pattern of the robot for each of one or more sub regions.

To be more specific, the moving path pattern acquiring unit 110 may acquire a centroid for each of one or more sub regions.

The moving path pattern acquiring unit 110 may acquire a plurality of path patterns configured by points having the same distance value with respect to the centroid for the sub region in the unit of the predetermined distance interval.

The moving path pattern acquiring unit 110 may acquire the plurality of acquired path patterns as moving path patterns for the sub regions.

For example, as illustrated in (a) of FIG. 3, when three sub regions (a first sub region, a second sub region, and a third sub region) are acquired from the map, the moving path pattern acquiring unit 110 may acquire a moving path pattern for each of three sub regions (the first sub region, the second sub region, and the third sub region) as illustrated in (b) of FIG. 3.

The moving path determining unit 130 may determine an actual moving path of the robot for each of one or more sub regions on the basis of a predetermined robot parameter and the moving path patterns for the sub regions.

That is, the moving path determining unit 130 may acquire a plurality of preliminary paths using the forward gaze distance and the minimum turning radius according to the predetermined robot parameter on the basis of a current position of the robot. Here, as the forward gaze distance is higher, it is possible to ensure a sufficient distance to avoid the collision.

To be more specific, the moving path determining unit 130 may acquire a plurality of front points which is separated from the centroid of the robot by the forward gaze distance in the unit of a predetermined angle. At this time, the moving path determining unit 130 may acquire a plurality of front points with respect to a centroid of two steering wheels of the robot. The steering wheel refers to a wheel which adjusts an angle to turn the direction of the robot, among wheels mounted in the robot.

For example, as illustrated in (a) of FIG. 4, a plurality of front points located to be separated from the centroid of two steering wheels by the forward gaze distance at a predetermined angle in a horizontal direction of an axis perpendicular to a wheel shaft.

The moving path determining unit 130 generates an arc connecting the robot and the plurality of front points to acquire a preliminary path candidate group. At this time, the moving path determining unit 130 may generate an arc for each of the plurality of front points using a geometric path tracking method (pure pursuit algorithm) which is a method of geometrically determining a curvature which moves from the robot to the front point to acquire a preliminary path candidate group.

For example, as illustrated in (b) of FIG. 4, the arc connecting the robot and the front point may be generated using the pure pursuit algorithm.

The moving path determining unit 130 may acquire preliminary paths whose turning radius is larger than a minimum turning radius according to the predetermined robot parameter, among the preliminary path candidate group, as a plurality of preliminary paths.

For example, as illustrated in FIG. 5, as the forward gaze distance becomes longer, the length of the arc connecting the robot and the front point is changed. At this time, the moving path determining unit 130 may remove preliminary paths whose turning radius is smaller than the minimum turning radius according to the predetermined robot parameter, among the preliminary path candidate group.

Further, the moving path determining unit 130 determines one of the plurality of preliminary paths as an actual moving path of the robot, on the basis of a distance from the moving path pattern and a distance from the obstacle.

To be more specific, the moving path determining unit 130 may acquire an evaluation score for each of the plurality of preliminary paths on the basis of the distance from the moving path pattern and the distance from the obstacle.

At this time, the moving path determining unit 130 may acquire the evaluation score on the basis of a first distance score, a first weight, a second distance score, and a second weight. Here, the first distance score is acquired on the basis of a distance between the preliminary path and the moving path pattern and as the distance between the preliminary path and the moving path pattern becomes shorter, a higher score is assigned as the first distance score. The first weight may be set in advance as a weight for the first distance score. The second distance score is acquired on the basis of the distance between the preliminary path and the obstacle and as the distance between the preliminary path and the obstacle becomes longer, a higher score is assigned as the second distance score. The second weight may be set in advance as a weight for the second distance score.

For example, the moving path determining unit 130 acquires the evaluation score for the preliminary path by means of an evaluation function expressed by the following Equation 1.

$$f(P)=\alpha * \text{Ref}(P) + \beta * \text{Obs}(P) \qquad \text{[Equation 1]}$$

Here, f(P) indicates an evaluation function, that is, an evaluation score for the preliminary path P. Ref(P) indicates a first distance score for the preliminary path P. Obs(P) indicates a second distance score for the preliminary path P. α indicates a weight for the first distance score. β indicates a weight for the second distance score. At this time, α and β which are constant gains are changed to adjust a ratio of the first distance score and the second distance score in the evaluation function.

The moving path determining unit 130 may determine a preliminary path having the highest evaluation score, among the plurality of preliminary paths, as an actual moving path of the robot. For example, as illustrated in FIG. 6, the moving path determining unit 130 acquires a plurality of preliminary paths using the predetermined robot parameter on the basis of the current position of the robot and acquires one preliminary path selected from the plurality of preliminary paths, on the basis of the distance from the moving path pattern and the distance from the obstacle, as an actual moving path.

The moving control unit 150 controls the robot to move along the actual moving path determined by the moving path determining unit 130.

That is, the moving control unit 150 may control the robot to move along the actual moving path at an optimal speed which is possible in the current position, on the basis of the speed information according to the predetermined robot parameter.

For example, as illustrated in FIG. 7, when the mopping cleaning robot completes the cleaning on the basis of the actual moving path according to the present disclosure, along one path pattern among the moving path patterns of the sub region, the mopping cleaning robot cleans along a next path pattern. Next, when the robot moves along all path patterns, among the moving path pattern of the sub region, that is, completes the cleaning of the entire sub region, the robot moves to another sub region which is closest to the current position, but is not cleaned.

Now, a moving path planning method for a robot according to an exemplary embodiment of the present disclosure will be described with reference to FIGS. 8 and 9.

Figure 8:
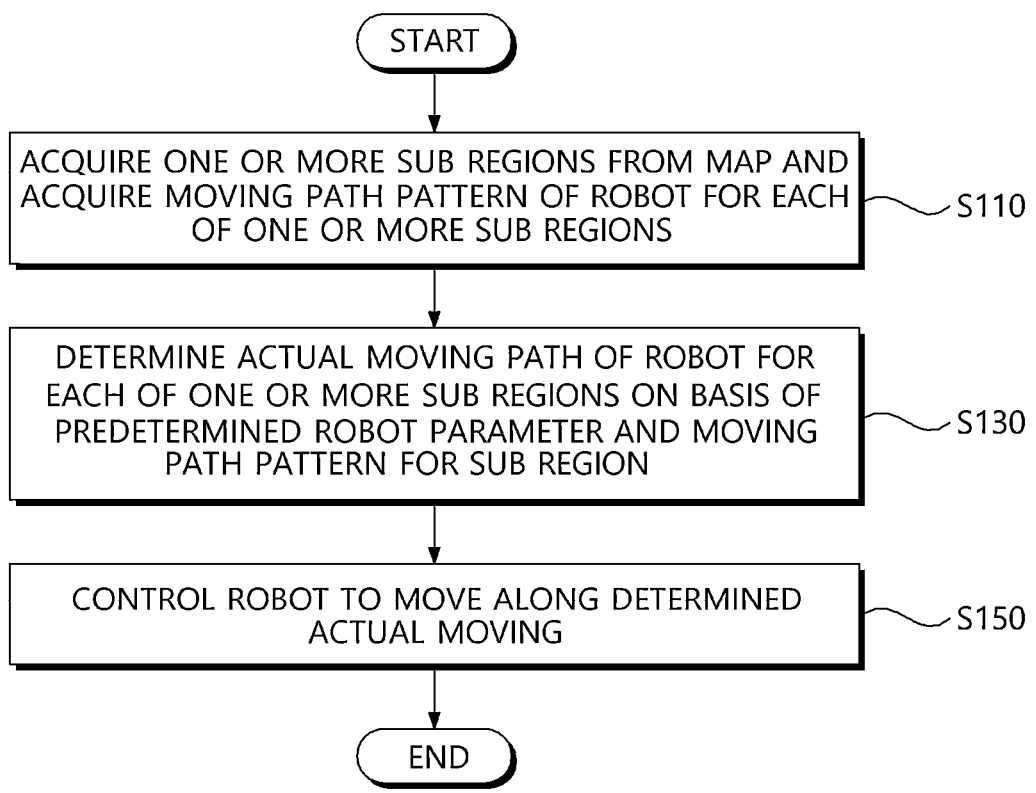
FIG. 8 is a flowchart illustrating a moving path planning method for a robot according to an exemplary embodiment of the present disclosure.

FIG. 8 is a flowchart illustrating a moving path planning method for a robot according to an exemplary embodiment of the present disclosure.

Referring to FIG. 8, the moving path planning apparatus 100 acquires one or more sub regions from a map and acquires a robot moving path pattern for each of one or more sub regions in step S110.

To be more specific, the moving path planning apparatus 100 acquires a centroid for a target region of the map, acquires a polygon having the maximum size corresponding to the target region while increasing a size of the polygon to a predetermined unit size with reference to the centroid for the target region, acquires the acquired polygon having the maximum size as the sub region, and acquires one or more sub regions from the map by repeatedly performing a process of excluding the polygon having the maximum size acquired as the sub region from the target region, on the target region, until the size of the target region becomes smaller than a robot size according to the predetermined robot parameter. At this time, the moving path planning apparatus 100 may determine the type of the polygon on the basis of a shape of the target region.

Further, the moving path planning apparatus 100 acquires a centroid for each of one or more sub regions, acquires a plurality of path patterns which is formed of points having the same distance value with respect to the centroid for the sub region in the unit of the predetermined distance interval, and acquires the plurality of acquired path patterns as the moving path pattern for the sub region.

Next, the moving path planning apparatus 100 may determine an actual moving path of the robot for each of one or more sub regions on the basis of a predetermined robot parameter and the moving path patterns for the sub regions in step S130.

Next, the moving path planning apparatus 100 may control the robot to move along the determined actual moving path in step S150.

That is, the moving path planning apparatus 100 may control the robot to move along the actual moving path at an optimal speed which is possible in the current position, on the basis of the speed information according to the predetermined robot parameter.

Figure 9:
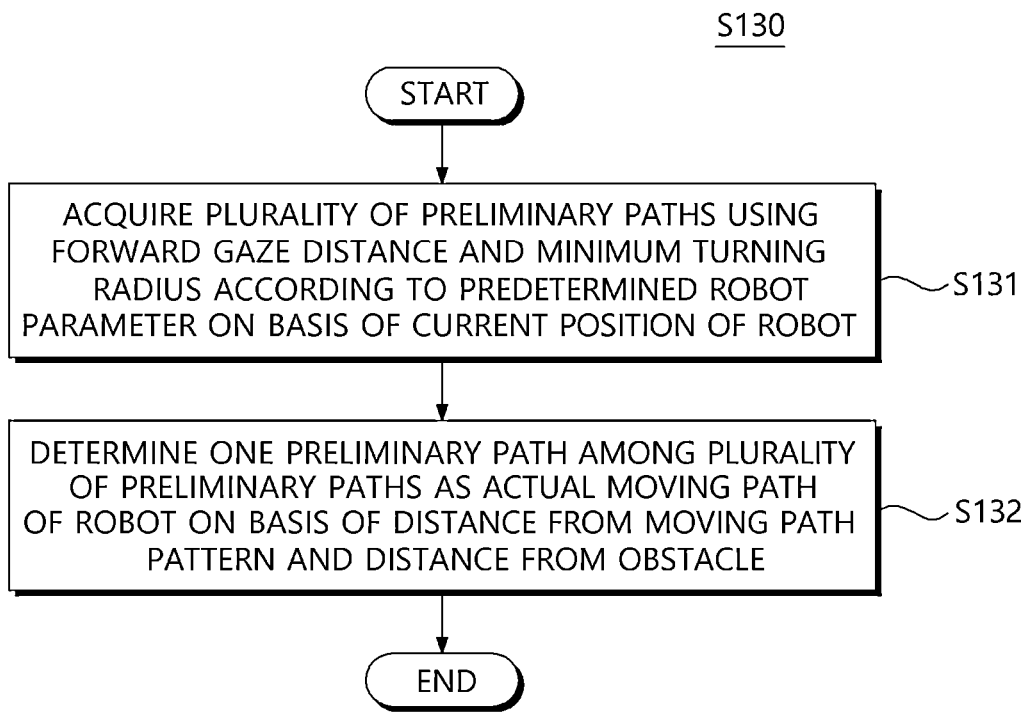
FIG. 9 is a flowchart for explaining sub steps of an actual moving path determining step illustrated in FIG. 8.

FIG. 9 is a flowchart for explaining sub steps of an actual moving path determining step illustrated in FIG. 8.

Referring to FIG. 9, the moving path planning apparatus 100 may acquire a plurality of preliminary paths using the forward gaze distance and the minimum turning radius according to the predetermined robot parameter on the basis of a current position of the robot in step S131.

That is, the moving path planning apparatus 100 may acquire a plurality of front points which is separated from a centroid of the robot by the forward gaze distance in the unit of a predetermined angle. At this time, the moving path planning apparatus 100 may acquire a plurality of front points with respect to a centroid of two steering wheels of the robot.

The moving path planning apparatus 100 generates an arc connecting the robot and the plurality of front points to acquire a preliminary path candidate group. At this time, the moving path planning apparatus 100 may generate an arc for each of the plurality of front points using a geometric path tracking method (pure pursuit algorithm) which is a method of geometrically determining a curvature which moves from the robot to the front point.

The moving path planning apparatus 100 may acquire preliminary paths whose turning radius is larger than a minimum turning radius according to the predetermined robot parameter, among the preliminary path candidate group, as a plurality of preliminary paths.

Next, the moving path planning apparatus 100 determines one of the plurality of preliminary paths as an actual moving path of the robot, on the basis of a distance from the moving path pattern and a distance from the obstacle, in step S132.

That is, the moving path planning apparatus 100 may acquire an evaluation score for each of the plurality of preliminary paths on the basis of the distance from the moving path pattern and the distance from the obstacle. At this time, the moving path planning apparatus 100 may acquire the evaluation score on the basis of a first distance score, a first weight, a second distance score, and a second weight. For example, the moving path planning apparatus 100 acquires the evaluation score for the preliminary path by means of an evaluation function expressed by the above Equation 1.

The moving path planning apparatus 100 may determine a preliminary path having the highest evaluation score, among the plurality of preliminary paths, as an actual moving path of the robot.

Even though it has been described above that all components of the exemplary embodiment of the present invention are combined as one component or operate to be combined, the present invention is not limited to the exemplary embodiment. In other words, one or more components may be selectively combined to be operated within a scope of the present invention. Further, all components may be implemented as one independent hardware but a part or all of the components are selectively combined to be implemented as a computer program which includes a program module which performs a part or all functions combined in one or plural hardware. Further, such a computer program may be stored in a computer readable media such as a USB memory, a CD disk, or a flash memory to be read and executed by a computer to implement the exemplary embodiment of the present invention. The recording media of the computer program may include a magnetic recording medium or an optical recording medium.

The above description illustrates a technical spirit of the present invention as an example and various changes, modifications, and substitutions become apparent to those skilled in the art within a scope of an essential characteristic of the present invention. Therefore, as is evident from the foregoing description, the exemplary embodiments and accompanying drawings disclosed in the present invention do not limit the technical spirit of the present invention and the scope of the technical spirit of the present invention is not limited by the exemplary embodiments and accompanying drawings. The protection scope of the present invention should be interpreted based on the following appended claims and it should be appreciated that all technical spirits included within a range equivalent thereto are included in the protection scope of the present invention.

What is claimed is:

1. A moving path planning apparatus for a robot, comprising:
one or more processors, the one or more processors configured to:
acquire one or more sub regions from a map and acquire a robot moving path pattern for each of one or more sub regions;
determine an actual moving path of the robot for each of one or more sub regions on the basis of a predetermined robot parameter and the moving path pattern for the sub region by acquiring a plurality of front points which is separated from a centroid of the robot by the forward gaze distance in a unit of a predetermined angle, acquiring a preliminary path candidate group by generating an arc connecting the robot and each of the plurality of front points, and acquiring preliminary paths having a turning radius which is larger than the minimum turning radius, among the preliminary path candidate group, as the plurality of preliminary paths; and
move the robot along the actual moving path.

2. The moving path planning apparatus according to claim 1, wherein the one or more processors are further configured to acquire the plurality of preliminary paths using a forward gaze distance and the minimum turning radius according to the predetermined robot parameter, on the basis of a current position of the robot and determines one preliminary path among the plurality of preliminary paths as the actual moving path of the robot on the basis of a distance from the moving path pattern and a distance from an obstacle.

3. The moving path planning apparatus according to claim 1, wherein the one or more processors are further configured to acquire the plurality of front points with respect to a centroid of two steering wheels of the robot and acquires the preliminary path candidate group by generating an arc for each of the plurality of front points using a geometric path tracking method (pure pursuit algorithm).

4. The moving path planning apparatus according to claim 2, wherein the one or more processors are further configured to acquire an evaluation score for each of the plurality of preliminary paths on the basis of the distance from the moving path pattern and the distance from the obstacle and determine a preliminary path having the highest evaluation score, among the plurality of preliminary path, as the actual moving path of the robot.

5. The moving path planning apparatus according to claim 4, wherein the one or more processors are further configured to acquire the evaluation score on the basis of a first distance score acquired on the basis of a distance between the preliminary path and the moving path pattern, a predetermined first weight for the first distance score, a second distance score acquired on the basis of the distance between the preliminary path and the obstacle, and a predetermined second weight for the second distance score,
as the distance between the preliminary path and the moving path pattern becomes shorter, a higher score is assigned as the first distance score, and
as the distance between the preliminary path and the obstacle becomes longer, a higher score is assigned as the second distance score.

6. The moving path planning apparatus according to claim 1, wherein the one or more processors are further configured to acquire a centroid for a target region of the map, acquires a polygon having the maximum size corresponding to the target region while increasing a size of the polygon to a predetermined unit size with reference to the centroid for the target region, acquire the acquired polygon having the maximum size as the sub region, and acquire one or more sub regions from the map by repeatedly performing a process of excluding the polygon having the maximum size acquired as the sub region from the target region, on the target region, until the size of the target region becomes smaller than a robot size according to the predetermined robot parameter.

7. The moving path planning apparatus according to claim 6, wherein the one or more processors are further configured to determine a type of the polygon on the basis of a shape of the target region.

8. The moving path planning apparatus according to claim 1, wherein the one or more processors are further configured to acquire a centroid for each of the one or more sub regions, acquire a plurality of path patterns which is formed of points having the same distance value with respect to the centroid for the sub region in a unit of a predetermined distance interval, and acquires the plurality of acquired path patterns as the moving path pattern for the sub region.

9. A moving path planning method performed by a moving path planning apparatus for a robot, comprising:
acquiring one or more sub regions from a map and acquiring a robot moving path pattern for each of one or more sub regions;
determining an actual moving path of the robot for each of one or more sub regions on the basis of a predetermined robot parameter and the moving path pattern for the sub region, wherein a plurality of front points which is separated from a centroid of the robot by a forward gaze distance is acquired in a unit of a predetermined angle, a preliminary path candidate group is generated by generating an arc connecting the robot and each of the plurality of front points, and preliminary paths having a turning radius which is larger than a minimum turning radius, among the preliminary path candidate group, are acquired as a plurality of preliminary paths; and
moving the robot along the actual moving path.

10. The moving path planning method according to claim 9, wherein the determining of an actual moving path includes:
a first step of acquiring a plurality of preliminary paths using the forward gaze distance and the minimum turning radius according to the predetermined robot parameter, on the basis of a current position of the robot; and
a second step of determining one preliminary path among the plurality of preliminary paths as the actual moving path on the basis of a distance from the moving path pattern and a distance from an obstacle.

11. The moving path planning method according to claim 10, wherein in the second step, an evaluation score for each of the plurality of preliminary paths is acquired on the basis of the distance from the moving path pattern and the distance from the obstacle and a preliminary path having the highest evaluation score, among the plurality of preliminary path, is determined as the actual moving path of the robot.

12. The moving path planning method according to claim 11, wherein in the second step, the evaluation score is acquired on the basis of a first distance score acquired on the basis of a distance between the preliminary path and the moving path pattern, a predetermined first weight for the first distance score, a second distance score acquired on the basis of the distance between a preliminary path and the obstacle, and a predetermined second weight for the second distance score, as the distance between the preliminary path and the moving path pattern becomes shorter, a higher score is assigned as the first distance score, and as the distance between the preliminary path and the obstacle becomes longer, a higher score is assigned to the second distance score.

13. A computer program stored in a non-transitory computer readable recording medium to allow a computer to execute the moving path planning method for a robot according to claim 9.

* * * * *